US006085430A

United States Patent [19]

Chen et al.

[11] Patent Number: 6,085,430

[45] Date of Patent: Jul. 11, 2000

[54] APPARATUS AND METHOD FOR MEASURING ECCENTRICITY BETWEEN TWO CIRCULAR MEMBERS

[75] Inventors: Yung-Dar Chen; Jung-Hao Hsiue; Shiuh-Sheng Chang, all of Hsin-Chu, Taiwan

[73] Assignee: Taiwan Semiconductor Manufacturing Company, Ltd., Hsin Chu, Taiwan

[21] Appl. No.: 09/090,729

[22] Filed: Jun. 4, 1998

[51] Int. Cl.[7] .......... G01B 5/25

[52] U.S. Cl. .......... 33/550; 33/613; 33/644

[58] Field of Search .......... 33/203, 543, 555.1, 33/550, 620, 613, 644, 645, 549, 529, 412, 555.3

[56] References Cited

U.S. PATENT DOCUMENTS

| | | | |
|---|---|---|---|
| 442,020 | 12/1890 | Darling | 33/832 |
| 968,996 | 8/1910 | Stackhouse | 33/833 |
| 2,522,283 | 9/1950 | Lamkin | 33/412 |
| 3,180,490 | 4/1965 | Fischer | 33/550 |
| 3,449,052 | 6/1969 | Rankin | 33/810 |
| 4,053,988 | 10/1977 | Budic | 33/550 |
| 4,563,824 | 1/1986 | Baun | 33/644 |
| 4,566,200 | 1/1986 | Brady et al. | 33/809 |
| 4,651,438 | 3/1987 | Hutter et al. | 33/550 |
| 5,084,982 | 2/1992 | Feng | 33/810 |
| 5,152,070 | 10/1992 | Sorokes | 33/530 |
| 5,979,071 | 11/1999 | Kim | 33/605 |

FOREIGN PATENT DOCUMENTS

| | | | |
|---|---|---|---|
| 0935193 | 6/1948 | France | 33/529 |
| 0093301 | 5/1985 | Japan | 33/530 |
| 0187601 | 8/1986 | Japan | 33/530 |
| 2139365 | 11/1984 | United Kingdom | 33/529 |

*Primary Examiner*—Diego Gutierrez
*Assistant Examiner*—Maria Fernandez
*Attorney, Agent, or Firm*—Tung & Associates

[57] ABSTRACT

An apparatus and a method for measuring eccentricity between two circular members which are attached together is provided. The apparatus includes a vernier measuring device of a main scale and a vernier scale, and a mounting block having a V-shaped notch in a top surface for receiving a circular member and for mounting the main scale of the vernier measuring device securely to the block. The novel apparatus and method can be used to not only making direct measurement of the eccentricity between the two centers, they may also be used to read directly the number of pulses required for making adjustment to a robot arm when the divisions on the main scale and the vernier scale are specifically designed for such purpose. The method can be carried out by first aligning the zero setting on the main scale with the center of the first circular member, and then aligning the zero setting on the vernier scale with the center of the second circular member, and then reading the distance between the two zero settings for determining the eccentricity.

18 Claims, 3 Drawing Sheets

APPARATUS AND METHOD FOR MEASURING ECCENTRICITY BETWEEN TWO CIRCULAR MEMBERS

FIELD OF THE INVENTION

The present invention generally relates to an apparatus and a method for measuring eccentricity between two circular members attached together and more particularly, relates to an apparatus and a method for measuring eccentricity between a wafer and a coating layer on the wafer by utilizing a mounting block for the wafer, a specially designed vernier measuring device including a main scale for aligning to the center of the wafer and a vernier scale for aligning to the center of the coating layer on the wafer and then determining the eccentricity between the two centers by measuring the distance between the two zero settings.

BACKGROUND OF THE INVENTION

In the fabrication process for a semiconductor device, numerous processing steps, i.e., as many as several hundred, must be performed on a semiconducting wafer to form the device. In the numerous processes, a wafer is frequently positioned on a rotating wafer chuck, or a vacuum chuck, for carrying out the specific process. Among such processes are the photoresist coating process, the photoresist developing process and an edge bead rinse process for removing an edge bead.

In a typical photoresist coating process, a small amount of a photoresist liquid is dispensed onto a wafer that rotates at high speed from a dispensing nozzle positioned at the center of the wafer. Since only a very thin coating of the photoresist material is normally required, the amount of the liquid photoresist material dispensed is small. When a liquid dispensing nozzle is not perfectly centered in relation to a rotating wafer, incomplete coverage or even voids on the wafer surface can occur. Such poor coverage of a photoresist coating on a wafer surface results in a high scrap rate of the devices formed on the wafer or even the scrap of the whole wafer.

After the photoresist coating process, a wafer is imaged in a stepper to reproduce circuits desired on the wafer. A liquid developer material is then dispensed onto the surface of the wafer in a technique similar to that used in dispensing the photoresist liquid. A perfectly centered dispensing nozzle for the developing liquid is crucial to the successful developing of the photoresist layer in order to reproduce the circuits.

After a photoresist material is coated, exposed and developed on the wafer surface, an edge bead rinse (EBR) process is frequently performed before the wafer can be further processed. This is due to the fact that, in most processing chambers, a clamp ring is used to hold the wafer down on a platform during a chemical or physical process. A peripheral edge on the top surface of the wafer that is overlapped by the clamp ring must therefore be cleaned of the photoresist material so that no photoresist material could crack under the clamp ring and thus causing serious contamination problems. The edge bead rinse process is an important step that must be carried out after a photoresist coating and developing process.

The wafer processing steps that involve the photoresist coating, developing and edge bead rinsing can be performed in a variety of commercially available process machines. One of such process machine is a WAFER-TRACK® machine for loading/unloading wafers into and out of various process chambers for photoresist coating, for photoresist developer coating and for edge bead rinsing. In a conventional wafer loading process, a main arm delivers a wafer into a process chamber through a slot opening. After a wafer is loaded on top of a vacuum chuck, the main arm withdraws from the slot opening. The movement of the main arm is controlled by a process controller through digital inputs by a machine operator. Conventionally, the only way for checking whether a wafer has been positioned, or centered, properly on a vacuum chuck is to rotate the wafer by hand. If the wafer is not positioned concentric with the vacuum chuck as indicated by an off-centered rotation of the wafer, the machine operator inputs a new set of digital data into the process controller based solely on his experience. The process is normally repeated several times before the movement of the main arm in positioning the wafer is properly calibrated. It is a trial and error process which requires a high skill level on the part of the machine operator. The procedure is therefore both time consuming and highly operator dependent.

In a conventional edge bead rinse process conducted in an edge bead rinse chamber, a nozzle assembly controlled by a digital step motor is frequently used to wash the edge bead on a wafer surface. Each bit or pulse movement by the digital step motor causes a displacement of the nozzle head by a distance of approximately 0.025 mm. For an eight inch wafer, a width of 3 mm±0.5 mm on the outer edge of the wafer is normally required for edge bead removal.

When a photoresist coated wafer is placed on a vacuum chuck for the edge bead rinse process, the centering of the wafer in relation to the vacuum chuck is very important. Improperly centered wafer results in an unevenly washed wafer edge with one side of the wafer having excessive photoresist coating and the other side of the wafer having insufficient photoresist coating. To prevent the uneven rinse of a wafer in an edge bead rinse process, a machine operator must provide data input to the main arm of the robot for positioning the wafer before a correct position can be found. The trial and error process is both labor and time consuming.

A conventional method for adjusting an edge bead rinse process is shown in FIG. 1. A wafer 10 which has a photoresist coating layer 12 on top was processed through an edge bead rinse chamber. After the edge bead rinse process was carried out, as shown in FIG. 1, the edge bead rinse process resulted in an off-centered coating pattern in that the washed edge A is wider than the opposite, washed edge B. In a conventional calibration method, a straight ruler 14 is used to measure the distance A and B at the two opposite ends of the wafer which appears to have a maximum and a minimum washed edge. After the values of A and B are measured by the straight ruler 14, the equation of $C=(B-A)/2$ is used to determine the magnitude of eccentricity (the distance between the centers for the two circular areas). The necessary digital input into the process controller for the robot (or the main arm) can then be calculated by using the "distance per pause" value D. For instance, when the magnitude of eccentricity is determined to be +0.25 mm, and the distance per pause value D for the robot arm is 0.025 mm/pulse, then the unit position of the robot arm should be adjusted by 10 pauses toward the positive direction. This is a slow and painstaking process in that the wafer must be carefully measured by a steel ruler and calculations must be carefully conducted. Several corrections are sometimes required to correctly center the wafer.

It is therefore an object of the present invention to provide an apparatus for measuring the eccentricity of a photoresist coating on a wafer that does not have the drawbacks or shortcomings of the conventional apparatus.

It is another object of the present invention to provide an apparatus for measuring eccentricity between two circular members attached together that is easy to operate and produces reliable results.

It is a further object of the present invention to provide an apparatus for measuring eccentricity between two circular members attached together by utilizing a vernier measuring device including a main scale and a vernier scale.

It is another further object of the present invention to provide an apparatus for measuring eccentricity between two circular members attached together by utilizing a vernier measuring device and a mounting block which has a V-shaped top surface for positioning the circular members.

It is still another object of the present invention to provide an apparatus for measuring eccentricity between a wafer and a coating layer on the wafer wherein the coating layer has a diameter that is slightly smaller than a diameter of the wafer.

It is yet another object of the present invention to provide an apparatus for measuring eccentricity between a wafer and a coating layer on the wafer by fixing a main scale of a vernier measuring device on a mounting block in such a way that a zero setting on the main scale coincides with the center of the wafer while the zero setting on the vernier scale coincides with the center of the coating layer.

It is still another further object of the present invention to provide a method for measuring eccentricity between a wafer and a coating layer on the wafer by mounting the wafer on a V-shaped mounting block and then aligning the zero setting on the main scale with the center of the wafer, the zero setting on the vernier scale with the center of the coating layer and determining the distance between the two zero settings.

It is yet another further object of the present invention to provide a method for measuring eccentricity between a wafer and a coating layer on a wafer by fixing the main scale of a vernier measuring device on a mounting block equipped with a V-shaped notch in a top surface and then positioning the wafer in the V-shaped notch such that the center of the wafer forms a line with the tip of the V which is perpendicular to a top surface of the mounting block.

SUMMARY OF THE INVENTION

The present invention discloses an apparatus and a method for measuring eccentricity between two circular members attached together, including but not limited to, a wafer and a coating layer on the wafer by utilizing a vernier measuring device having a main scale and a vernier scale and a mounting block for mounting a wafer to be measured.

In a preferred embodiment, an apparatus for measuring eccentricity between two circular structures that are attached together is provided which includes a vernier measuring device having a main scale and a vernier scale, the vernier scale is adapted for sliding in a slot opening provided in the main scale, a mounting block which has a V-shaped top surface adapted for receiving the main scale of the vernier measuring device with its longitudinal axis perpendicular to the mounting block and its center line intersects the tip of the "V" in the V-shaped top surface, a first circular structure with its radial axis perpendicular to the mounting block such that a first zero setting on the main scale coincides with a center of the first circular structure, and a second circular structure attached to the first circular structure and having its radial axis perpendicular to the mounting block such that a second zero setting on the vernier scale coincides with a center of the second circular structure, such that an eccentricity between the first circular structure and the second circular structure can be determined by a distance between the first zero setting on the main scale and the second zero setting on the vernier scale.

The second circular structure can be a coating formed on the first circular structure. The first circular structure may be a circular disk which has a first diameter and the second circular structure may be a coating which has a second diameter on the circular disk, with the second diameter smaller than the first diameter. The first circular structure may be a wafer and the second circular structure may be a layer of a photoresist coating on a center portion of the wafer. The main scale and the vernier scale of the vernier measuring device can be designed such that a distance measured between the first and second zero settings is readily converted to a pulse setting for inputting to a robot device that delivers the first circular structure into a process machine for calibrating the robot. The main scale of the vernier measuring device has one end along its longitudinal axis attached to the mounting block. The end may be attached to the mounting block by mechanical means. The end is attached to the mounting block such that a longitudinal axis of the main scale is perpendicular to a bottom surface of the mounting block and a center line of the main scale along a longitudinal axis intersects the tip of the "V" in the V-shaped top surface of the block.

In another preferred embodiment, an apparatus for measuring eccentricity between a wafer and a coating layer on the wafer is provided which includes a vernier measuring device having a main scale and a vernier scale, the vernier scale is adapted to slide in a slot opening provided in the main scale, a mounting block which has V-notch in a top surface adapted for fixably receiving the main scale such that a longitudinal axis of the main scale is perpendicular to the top surface of the block and a wafer positioned in the V-notch with its radial axis perpendicular to the top surface of the block, its center coincides with a zero setting on the main scale and a center of the coating layer on the wafer coincides with a zero setting on the vernier scale such that the eccentricity can be determined by a distance between the zero setting on the main scale and the zero setting on the vernier scale.

The main scale of the apparatus can be fixably received by the mounting block by mechanical means. The coating layer on the wafer can be a photoresist or other coating layer. The coating layer on the wafer may have a diameter that is at least 2 mm smaller than the diameter of the wafer. The coating layer on the wafer may further have a circular form that is off-centered from the wafer. The main scale and the vernier scale of the vernier measuring device are designed in such a way that a distance measured between the first and second zero settings is readily converted to a pulse setting for inputting to a robot device which delivers the wafer into a process machine for calibrating the robot.

The present invention is further directed to a method for measuring eccentricity between a first circular member and a second circular member attached together in a face-to-face relationship which can be carried out by the operating steps of providing a vernier measuring device including a main scale and a vernier scale, providing a mounting block which has a V-notch in a top surface, attaching the main scale to the mounting block in such a way that a longitudinal axis of he main scale is perpendicular to the top surface of the mounting block, a center line of the main scale intersects a tip of the "V" in the V-notch, and a zero setting on the main scale coincides with a center of the first circular member subsequently positioned on the mounting block, positioning the first and second circular members in the V-notch on the mounting block with circular planes of the members perpendicular to the top surface of the mounting block and being supported by the two sloped shoulder portions of the V-notch, sliding the vernier scale in a slot opening in the main scale until a zero setting of the vernier scale coincides with a center of the second circular member, and measuring eccentricity by a distance between the zero setting on the main scale and the zero setting on the vernier scale.

The method may further include a first circular member that is a wafer and a second circular member that is a coating on the wafer which has a diameter smaller than a diameter of the wafer. The first circular member may be a wafer and the second circular member may be a photoresist coating layer on the wafer. The method may further include the step of dividing the main scale and the vernier scale in such a way that a distance measured between the two zero settings can be readily converted to a pulse setting for inputting into a robot such that the robot delivery of a wafer into a process chamber can be calibrated.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a n apparatus and a method for measuring eccentricity between two circular members that are attached together by using a vernier measuring device and a mounting block specifically designed for holding a circular member securely therein. The vernier measuring device has a main scale and a vernier scale wherein the vernier scale is adapted for sliding in a slot opening provided in the main scale. The mounting block has a V-shaped notch in its top surface adapted for receiving the main scale of the vernier measuring device with its longitudinal axis perpendicular to the mounting block, and a circular member in its V-shaped notch.

The present invention novel apparatus and method provides at least two major benefits that were not previously achievable by any conventional methods or apparatus. First, by utilizing a specifically designed main scale and vernier scale, a small difference in eccentricity can be magnified and easily read visually by a machine operator. Secondly, when the main scale and the vernier scale are divided in a specific division, the unit reading from the vernier measuring device can be directly converted to pulse units that can be used as an input to a robot arm such that the positioning of a circular member on a processing platform can be easily calibrated.

Figure 1:
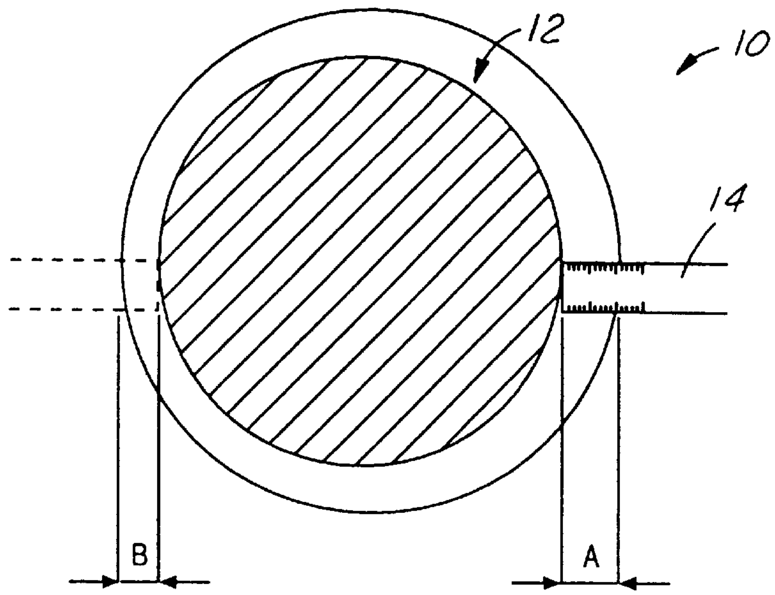
FIG. 1 is a plane view of a conventional wafer having a coating layer deposited on top in an off-centered position.
Figure 2A:
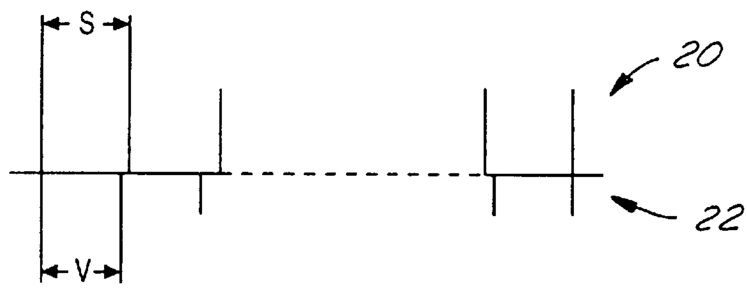
FIG. 2A is an illustration of a relationship between a main scale and a vernier scale.
Figure 2B:
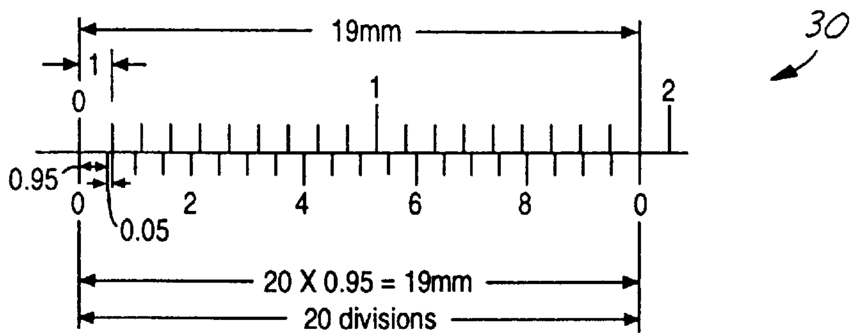
FIG. 2B is an illustration of the relationship between a main scale of 19 mm and a vernier scale divided in twenty divisions.

Referring now to FIGS. 2A and 2B wherein a conventional vernier measuring device having a main scale 20 and a vernier scale 22 is shown. The divisions on the main scale 20 and the vernier scale 22 can be designed such that the device achieves the highest precision and further, the divisions on the device can be easily read. In designing a vernier measuring device, the main scale 20 may be divided into (n−1) divisions, while the vernier scale can be divided into n=divisions. A length represented by 9 divisions on the main scale is therefore represented by 10 divisions on the vernier scale. The smallest readable unit on the vernier scale can therefore be calculated by the following method:

$$(n-1)S = n \times V$$

$$V = \frac{n-1}{n}S$$

$$\begin{aligned} C &= S - V \\ &= S - \frac{n-1}{n}S \\ &= S\left(\frac{n-1+1}{n}\right) \\ &= \frac{S}{n} \end{aligned}$$

Wherein (n−1) is the divisions on the main scale, n is the divisions on the vernier scale, S is the length of each division on the main scale, V is the length of each division on the vernier scale, and C is the smallest readable unit on the vernier scale.

An example of a 1/20 vernier measuring device 30 is shown in FIG. 2B. It is seen that the main scale is divided into 19 divisions, i.e., (n−1)=19. The length of each division on the main scale is 1 mm, i.e., S=1 mm. The total number of divisions on the vernier scale is n, i.e., n=20. The length of each division on the vernier scale is 19/20 mm. The smallest readable unit on the vernier scale is therefore 1/20=0.05 mm.

Figure 3:
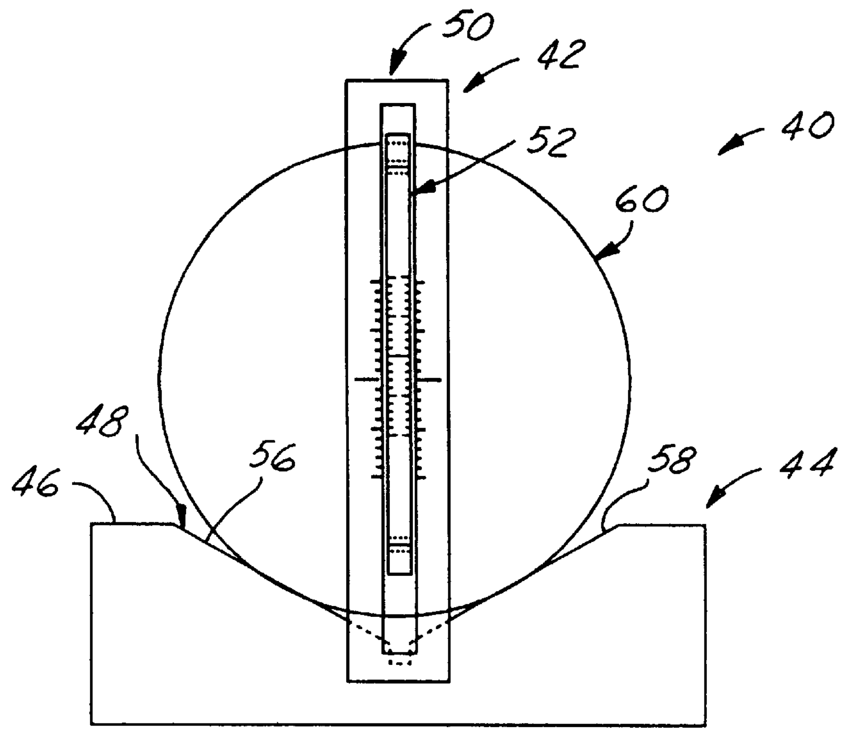
FIG. 3 is a front view of the present invention apparatus of the vernier measuring device mounted to a mounting block.

A present invention novel apparatus 40 which comprises a vernier measuring device 42 and a mounting block 44 is shown. The vernier measuring device further includes a main scale 50 and a vernier scale 52. As shown in FIG. 3, the present invention vernier measuring device is normally mounted, either fixably or removably, to the mounting block 44 by fixing the main scale 50 to the block by mechanical means (not shown) at the end 54. The mounting block 44, shown in FIG. 4 in a front view, may have a suitable thickness such as 6~12 inches depending on the specific application. The top surface 46 of the mounting block 44 is provided with a V-shaped notch 48 with two sloped shoulders 56 and 58. The two sloped shoulders 56, 58 provides a cradle for holding a wafer 60 therein securely. Furthermore, the V-notch 48 further provides a means for automatically centering the wafer 60 in relation to the V-notch 48 such that the center of the wafer 60 is aligned with the tip 64 of the V-notch 48. The mounting block 44 can be advantageously fabricated of wood or plastic for easy handling. The end 54 of the main scale 50 can be easily fixed to the mounting block 44 by mechanical means such as screws (not shown).

Figure 4:
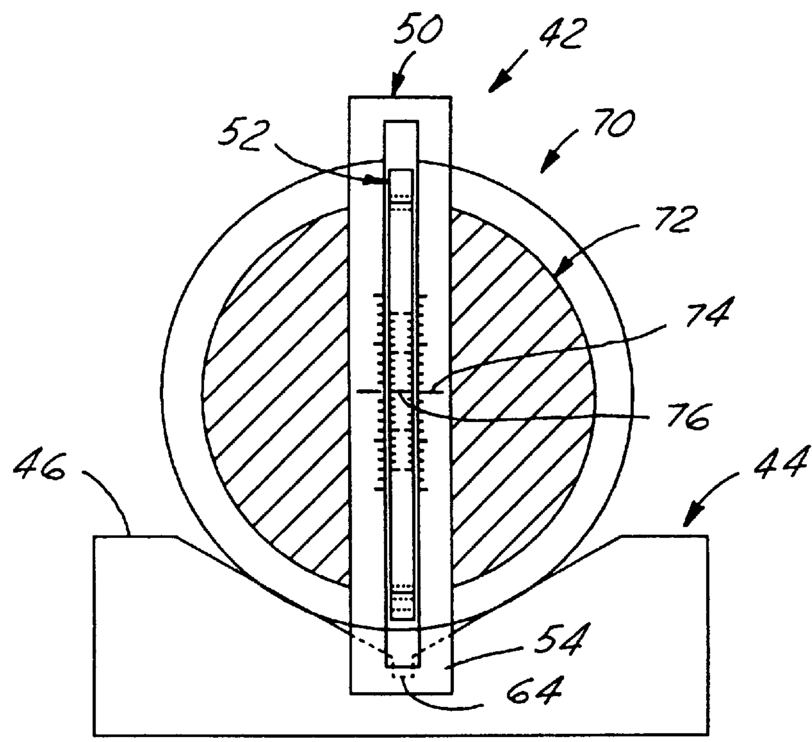
FIG. 4 is a front view of the present invention apparatus of FIG. 3 having a wafer with a perfectly centered coating layer positioned therein.

FIG. 4 is a front view of the present invention novel apparatus of FIG. 3 having a wafer 70 positioned therein. As shown in FIG. 4, the wafer 70 is provided with a coating layer 72 on its surface which is perfectly centered with the wafer 70. The perfect centering, or zero eccentricity, can be seen by the overlap of the zero setting 74 on the main scale and the zero setting 76 on the vernier scale.

The present invention novel method of measuring eccentricity can be carried out in the following manner. First, the vernier measuring device 42 is designed such that when the robotic arm for positioning a wafer on a process platform makes a unit movement, i.e., a pulse, each pulse or each minimum displacement is approximately 0.025 mm and therefore, the accuracy of the vernier measuring device 42 is designed as ${}^{1}/_{40}$ mm. This is carried out by dividing the main scale such that each division is 1 mm, the vernier scale such that each division is ${}^{39}/_{40}$ mm, and therefore 39 mm is equally divided into 40 portions.

After the vernier measuring device 42 is suitably designed as described above such that the accuracy of the device corresponds to the minimum displacement (or pulse) of the robot arm, the present invention novel method of measuring eccentricity between two circular members can be carried out. This is shown in FIG. 5.

First, the main scale 50 is fixed to the mounting block 44 at end 54 by mechanical means such that, when wafer 70 is positioned in the V-notch 48, the zero setting 74 on the main scale 50 is aligned with the geometric center of the wafer 70. This is shown in FIG. 5. The next step requires the locating of the geometric center of the coating layer 72 by the vernier scale 52. This can be easily carried out by first determining the diameter of the coating layer which is normally known or can be measured by a vernier caliper. For instance, in a 200 mm diameter wafer (8 inch wafer), the diameter of a coating layer of photoresist material on top of the wafer surface is normally 195 mm. In other words, when the coating process is conducted with zero eccentricity, there should be an equal space of 2.5 mm along the entire periphery of the wafer. To facilitate the center of the vernier scale 52 to the coating layer 72, the diameter of the coating layer, i.e., 195 mm can be divided in half to 97.5 mm. Two marks at +97.5 mm and −97.5 mm can then be located on the vernier scale 52 on the plus side and the minus side from the zero setting 76. For instance, mark 82 indicates the +97.5 mm while mark 84 indicates the −97.5 mm. After the two marks are aligned to the edge of the coating layer 72, the deviation of the zero setting 76 from the zero setting 74 on the main scale, i.e., shown as E in FIG. 5, can be easily identified.

Figure 5:
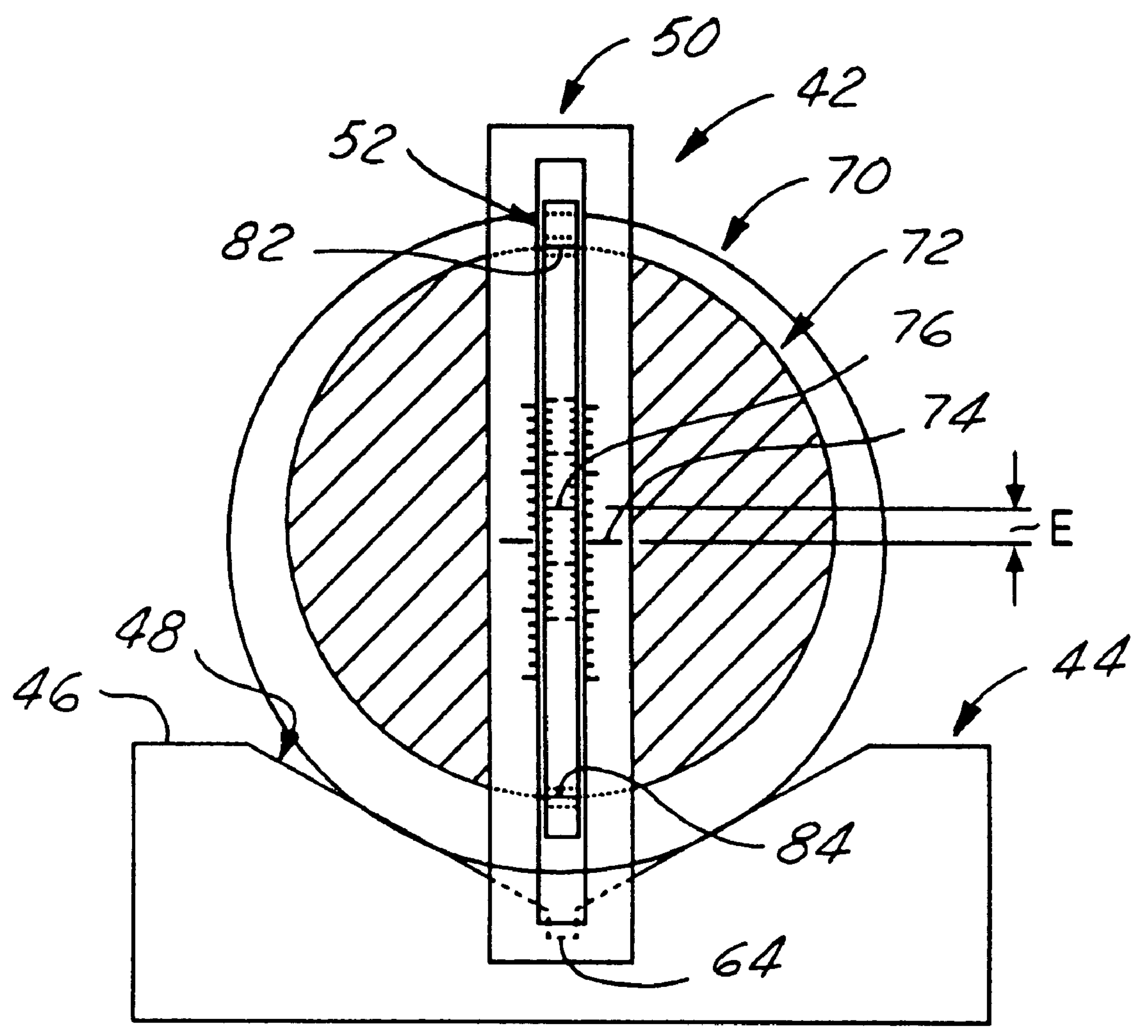
FIG. 5 is a front view of the present invention apparatus of FIG. 3 having a wafer with an off-centered coating layer positioned therein.

For example, in the FIG. 5 illustration, since the robot arm moves by each pulse which equals to 0.025 mm (or ${}^{1}/_{40}$ mm), the division on the main scale is set at 1 mm while the division on the vernier scale is set at ${}^{39}/_{40}$ mm. The difference in the divisions on the main scale and the vernier scale can therefore be calculated as: $1{}^{39}/_{40}={}^{1}/_{40}$ mm=0.025 mm=1 pulse. The present invention novel method therefore enables one to read directly from a vernier measuring device the number of pulses that needs to be adjusted into a robot arm. As shown in FIG. 5, the eccentricity E is measured at 2.5 mm on the main scale 50 and therefore, since 1 mm=40 pulse, a total of $2.5\times40=100$ pulse needs to be adjusted in the robot arm. It should be noted that the illustration shown in FIG. 5 is exaggerated to clearly exemplify the present invention method. In normal fabrication processes, the eccentricity between the coating layer and the wafer is normally smaller, i.e., only 10~20 pulse may be required for adjustment of the robot arm.

The present invention novel method and apparatus has therefore been amply demonstrated in the above descriptions and in the appended drawings of FIGS. 3~5. It should be noted, that while a wafer coated with a photoresist layer is illustrated in the present invention method, the method and apparatus can be used on any circular members that are attached together, or a circular member that has any type of coating layer on top.

While the present invention has been described in an illustrative manner, it should be understood that the terminology used is intended to be in a nature of words of description rather than of limitation.

Furthermore, while the present invention has been described in terms of a preferred embodiment and two alternate embodiments, it is to be appreciated that those skilled in the art will readily apply these teachings to other possible variations of the inventions.

The embodiment of the invention in which an exclusive property or privilege is claimed are defined as follows:

What is claimed is:

1. An apparatus for measuring eccentricity between two circular structures attached together comprising:

a vernier measuring device comprises a main scale and a vernier scale, said vernier scale for sliding in a slot opening provided in said main scale, a mounting block having a V-shaped top surface for receiving said main scale of the vernier measuring device with its longitudinal axis perpendicular to said mounting block and its center line intersects the bottom of the "V" in said V-shaped top surface such that a first zero setting on said main scale coincides with a center of a first circular structure, and a second circular structure attached to said first circular structure and having its radial axis perpendicular to said mounting block such that a second zero setting on said vernier scale coincides with a center of said second circular structure, wherein an eccentricity between said first circular structure and said second circular structure is determined by a distance between said first zero setting on said main scale and said second zero setting on said vernier scale.

2. An apparatus for measuring eccentricity between two circular structures according to claim 1, wherein said second circular structure is a coating formed on said first circular structure.

3. An apparatus for measuring eccentricity between two circular structures according to claim 1, wherein said first circular structure is a circular disk having a first diameter and said second circular structure is a coating having a second diameter situated on said circular disk, said second diameter being smaller than said first diameter.

4. An apparatus for measuring eccentricity between two circular structures according to claim 1, wherein said first circular structure is a wafer and said second circular structure is a layer of a photoresist coating placed on a center portion of said wafer.

5. An apparatus for measuring eccentricity between two circular structures according to claim 1, wherein said main scale and said vernier scale of said vernier measuring device are designed in such a way that a distance measured between said first and second zero settings is readily converted to a pulse setting for inputting to a robot device which delivers said first circular structure into a process machine for calibrating said robot.

6. An apparatus for measuring eccentricity between two circular structures according to claim 1, wherein said main scale of said vernier measuring device having one end along its longitudinal axis attached to said mounting block.

7. An apparatus for measuring eccentricity between two circular structures according to claim 6, wherein said end being attached to said mounting block by mechanical means.

8. An apparatus for measuring eccentricity between two circular structures according to claim 6, wherein said end is attached to said mounting block such that a longitudinal axis of said main scale being perpendicular to a bottom surface of said mounting block and a center line of said main scale along a longitudinal axis intersects the tip of the "V" in said V-shaped top surface of the block.

9. An apparatus for measuring eccentricity between a wafer and a coating layer on the wafer comprising:

a vernier measuring device including a main scale and a vernier scale, the vernier scale slides in a slot opening provided in the main scale, a mounting block having a V-notch in a top surface for fixably receiving said main scale such that a longitudinal axis of the main scale being perpendicular to the top surface of said block, and a wafer positioned in said V-notch with its radial axis perpendicular to the top surface of the block, its center coincides with a zero setting on said main scale and a center of said coating layer on the wafer coincides with a zero setting on said vernier scale such that said eccentricity is determined by a distance between the zero setting on the main scale and the zero setting on the vernier scale.

10. An apparatus for measuring eccentricity between a wafer and a coating layer on the wafer according to claim 9, wherein said main scale being fixably received by said mounting block by mechanical means.

11. An apparatus for measuring eccentricity between a wafer and a coating layer on the wafer according to claim 9, wherein said coating layer on said wafer is a photoresist coating layer.

12. An apparatus for measuring eccentricity between a wafer and a coating layer on the wafer according to claim 9, wherein said coating layer on said wafer having a diameter that is at least 2 mm smaller than a diameter of said wafer.

13. An apparatus for measuring eccentricity between a wafer and a coating layer on the wafer according to claim 9, wherein said coating layer on said wafer having a circular form that is off-centered from said wafer.

14. An apparatus for measuring eccentricity between a wafer and a coating layer on the wafer according to claim 9, wherein said main scale and said vernier scale of said vernier measuring device are designed in such a way that a distance measured between said first and second zero settings is readily converted to a pulse setting for inputting to a robot device which delivers said wafer into a process machine for calibrating said robot.

15. A method for measuring eccentricity between a first circular member and a second circular member attached together in a face-to-face relationship comprising the steps of:

providing a vernier measuring device comprises a main scale and a vernier scale, providing a mounting block having a V-notch in a top surface, attaching said main scale to said mounting block in such a way that a longitudinal axis of said main scale being perpendicular to said top surface of the mounting block, a center line of said main scale intersects a tip of the "V" in said V-notch, and a zero setting on said main scale coincides with a center of said first circular member subsequently positioned on said mounting block, positioning said first and second circular member in said V-notch on the mounting block with circular planes of said circular members being perpendicular to said top surface of the mounting block and being supported by two sloped shoulder portions of said V-notch, sliding said vernier scale in a slot opening in said main scale until a zero setting of the vernier scale coincides with a center of said second circular member, and measuring eccentricity by a distance between the zero setting on the main scale and the zero setting on the vernier scale.

16. A method for measuring eccentricity between a first circular member and a second circular member attached together in a face-to-face relationship according to claim 15, wherein said first circular member is a wafer and said second circular member is a coating on said wafer having a diameter smaller than a diameter of the wafer.

17. A method for measuring eccentricity between a first circular member and a second circular member attached together in a face-to-face relationship according to claim 15, wherein said first circular member is a wafer and said second circular member is a photoresist coating layer on said wafer.

18. A method for measuring eccentricity between a first circular member and a second circular member attached together in a face-to-face relationship according to claim 15 further comprising the step of dividing said main scale and said vernier scale in such a way that a distance measured between said two zero settings is readily convertible to a pulse setting for inputting into a robot such that the robot delivery of a wafer into a process chamber can be calibrated.

* * * * *